(No Model.)

C. HUCH.
BOTTLE STOPPER.

No. 512,652. Patented Jan. 9, 1894.

Witnesses:
A. Schehl.
Wm. Schulz.

Inventor:
C. Huch, per
Roeder & Briesen
Attorneys.

UNITED STATES PATENT OFFICE.

CHARLES HUCH, OF HOBOKEN, NEW JERSEY.

BOTTLE-STOPPER.

SPECIFICATION forming part of Letters Patent No. 512,652, dated January 9, 1894.

Application filed January 11, 1893. Serial No. 457,995. (No model.)

*To all whom it may concern:*

Be it known that I, CHARLES HUCH, of Hoboken, Hudson county, New Jersey, have invented an Improved Bottle-Stopper, of which the following is a specification.

This invention relates to a bottle stopper of the kind which closes the base of the neck and is pushed partly into the bottle when the latter is to be opened.

Figure 1:
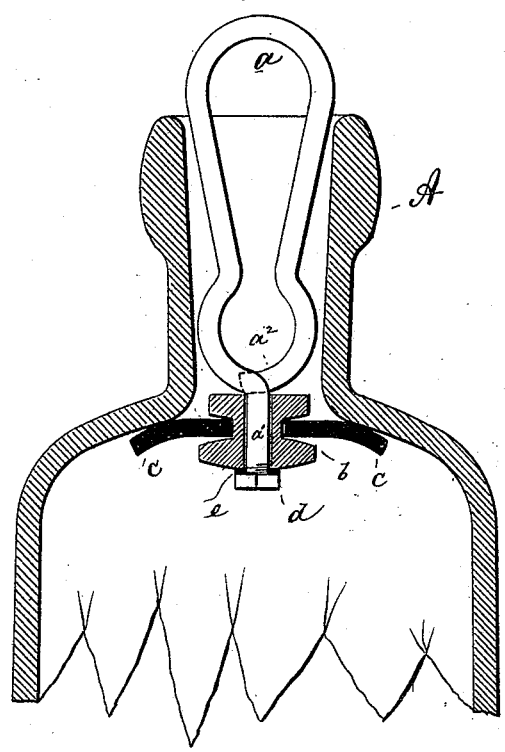
Figure 2:
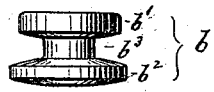

In the accompanying drawings: Figure 1 is an elevation partly in section of my improved bottle stopper. Fig. 2 is a detail side view of the double headed sleeve $b$.

The letter $a$, represents a wire, bent to form an open spring loop that is adapted to bear against the inner face of the bottle neck A, and to thus hold the stopper in place. One of the ends $a'$, of the loop $a$, is bent down to form a shank. Upon this shank there is loosely slipped a perforated sleeve $b$, made of porcelain. This sleeve is provided with an upper head $b'$, a lower head $b^2$, and an intermediate contracted neck $b^3$. The annular rubber packing $c$, is slipped over the sleeve so as to be held in place between the two heads. The lower end of the shank $a'$, is threaded to receive a nut $d$, between which and the sleeve a rubber gasket $e$, may be placed.

It will be seen that in my improved stopper the porcelain sleeve $b$, forms a ready means for securing the packing $c$, to the wire $a$. The sleeve is strong, cleanly and being simply slipped upon the wire can be readily removed or replaced by detaching the nut. The second shank $a^2$, of the wire $a$, is curved and bears upon the upper side of the sleeve so as to hold the same down upon the gasket $e$, to produce a tight joint.

What I claim is —

In a bottle stopper, the combination of a bent wire, screw-threaded at its lower end, and having a downwardly extending spring arm, a porcelain sleeve passed loosely upon the lower end of the bent wire, a rubber packing on the sleeve for stopping the bottle, a gasket and nut on the screw-threaded lower end supporting the sleeve, the downwardly extended spring arm being arranged to press upon the upper side of the sleeve, whereby a tight joint is formed between the sleeve and nut, substantially as described.

CHAS. HUCH.

Witnesses:
F. V. BRIESEN,
WM. SCHULZ.